United States Patent
Sampayan (12) United States Patent (10) Patent No.: US 10,270,368 B2
(45) Date of Patent: Apr. 23, 2019

(54) BI-DIRECTIONAL, TRANSFORMERLESS VOLTAGE SYSTEM

(71) Applicant: Lawrence Livermore National Security, LLC, Livermore, CA (US)

(72) Inventor: Stephen E. Sampayan, Manteca, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 209 days.

(21) Appl. No.: 15/368,384

(22) Filed: Dec. 2, 2016

(65) Prior Publication Data

US 2018/0159443 A1    Jun. 7, 2018

(51) Int. Cl.
| | |
|---|---|
| *H02J 3/32* | (2006.01) |
| *H02J 7/34* | (2006.01) |
| *H02M 3/07* | (2006.01) |
| *H02M 7/70* | (2006.01) |
| *H02M 1/12* | (2006.01) |
| *H02J 3/38* | (2006.01) |
| *H02M 7/797* | (2006.01) |

(Continued)

(52) U.S. Cl.
CPC .............. *H02M 7/70* (2013.01); *H02J 3/32* (2013.01); *H02J 3/382* (2013.01); *H02J 3/383* (2013.01); *H02J 3/386* (2013.01); *H02J 7/34* (2013.01); *H02M 1/12* (2013.01); *H02M 3/07* (2013.01); *H02M 7/797* (2013.01); *H02J 3/36* (2013.01); *H02J 9/062* (2013.01); *H02M 2003/072* (2013.01)

(58) Field of Classification Search
CPC ...... H02J 3/28; H02J 3/32; H02J 3/382; H02J 3/383; H02J 3/386; H02J 7/34; H02M 1/12; H02M 3/07; H02M 7/70; H02M 7/797; H02M 2003/072
See application file for complete search history.

(56) References Cited

U.S. PATENT DOCUMENTS 4,134,057 A * 1/1979 Portmann ............ G04C 10/02
136/291
6,344,985 B1 * 2/2002 Akerson ............ H02M 3/1582
363/65

(Continued)

OTHER PUBLICATIONS

International Search Report and Written Opinion of International Application No. PCT/US2017/063890; dated Mar. 30, 2018; 15 pages.

(Continued)

*Primary Examiner* — Levi Gannon
(74) *Attorney, Agent, or Firm* — Perkins Coie LLP (57) ABSTRACT

A multi-stage electric voltage converter is disclosed. The converter comprises a voltage source and multiple stages. Each stage of the multiple stages comprises a first and a second and a third switch, and a capacitor, wherein the capacitor is coupled to the voltage source by the first and the second switches and each stage is coupled to a different stage or to an output of the multi-stage electric voltage converter by the third switch so as to allow the capacitor to be charged by the voltage source when the first and the second switches are closed and the third switch is open, and to allow the capacitor to be connected to the output of the multi-stage electric voltage converter when the first and the second switches are open and the third switch is closed.

27 Claims, 10 Drawing Sheets

(51) Int. Cl.
*H02J 3/36* (2006.01)
*H02J 9/06* (2006.01)

(56) References Cited

U.S. PATENT DOCUMENTS

| | | | |
|---|---|---|---|
| 6,407,483 B1* | 6/2002 | Nunuparov | G21H 1/00 310/339 |
| 9,660,520 B2* | 5/2017 | Perreault | H02M 1/4208 |
| 9,667,139 B2* | 5/2017 | Giuliano | H02M 3/07 |
| 2008/0007981 A1 | 1/2008 | Erbito | |
| 2008/0304292 A1 | 12/2008 | Zeng et al. | |
| 2011/0062940 A1* | 3/2011 | Shvartsman | H02M 3/07 323/351 |
| 2011/0273916 A1* | 11/2011 | Fujiwara | H02M 7/487 363/71 |
| 2012/0038330 A1* | 2/2012 | Buiatti | H02M 3/1582 323/234 |
| 2013/0200860 A1* | 8/2013 | Takeda | H02J 7/0024 320/167 |
| 2014/0270777 A1 | 9/2014 | Sampayan | |
| 2015/0097546 A1 | 4/2015 | Pan et al. | |
| 2015/0263612 A1* | 9/2015 | Wu | H02M 3/07 323/312 |
| 2016/0149478 A1 | 5/2016 | Low et al. | |
| 2018/0026528 A1* | 1/2018 | Xiong | H02M 3/07 323/312 |
| 2018/0205315 A1* | 7/2018 | Giuliano | H02M 3/07 |

OTHER PUBLICATIONS

Khomfoi, et al., "A 5-Level Cascaded Hybrid Multilevel Inverter for Interfacing with Renewable Energy Resources," 2009 6th International Conference on Electrical Engineering/Electronics, Computer, Telecommunications and Information Technology, Pattaya, Chonburi, Thailand, 4 pages.

* cited by examiner

BI-DIRECTIONAL, TRANSFORMERLESS VOLTAGE SYSTEM

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

TECHNICAL FIELD

This patent document relates to voltages conversion systems for grid-tied storage of renewable energy.

BACKGROUND

Grid-tied energy storage systems play an increasing role in providing stabilization and security to the nation's energy transmission grid. These systems assist integration of the increasing number of renewable energy sources into the grid by allowing storage of excess energy during peak production times and delivery when needed. They allow electric utilities to increase system performance, reliability and security, smooth integration of renewable energy production, and delay building new peak demand capacity. Industrial users can also realize benefits from grid-tied storage systems for uninterruptible power supplies and economical time-of-use pricing.

SUMMARY

Techniques, systems, and devices are disclosed for implementing a bi-directional, transformerless voltage system that can convert low voltage to high voltage, and vice versa.

In one exemplary aspect, a multi-stage electric voltage converter is disclosed. The converter comprises a voltage source and multiple stages. Each stage of the multiple stages comprises a first and a second and a third switch, and a capacitor, wherein the capacitor is coupled to the voltage source by the first and the second switches and each stage is coupled to a different stage or to an output of the multi-stage electric voltage converter by the third switch so as to allow the capacitor to be charged by the voltage source when the first and the second switches are closed and the third switch is open, and to allow the capacitor to be connected to the output of the multi-stage electric voltage converter when the first and the second switches are open and the third switch is closed.

In another exemplary aspect, a bidirectional electric voltage converter is disclosed. The converter comprises a cascade configuration of a plurality of stages and an isolation switch. Each stage of the plurality of stages comprises a first switch coupled to a low voltage side of the bidirectional electric converter; a capacitor coupled to the first switch; a second switch coupled to a high voltage side of the bidirectional electric converter and to the capacitor; and a third switch that couples each stage to another stage or to the high voltage side of the bidirectional electric converter. The isolation switch allows isolation of the capacitor from the low voltage side.

In another exemplary aspect, a method of providing a voltage conversion by a multi-stage bidirectional electric voltage converter is disclosed. The method comprises supplying a voltage from a voltage source to one or more stages of the multi-stage bidirectional electric voltage converter, wherein each stage of the multi-stage bidirectional electric voltage converter includes a first, a second and a third switch and a capacitor, and the capacitor is coupled to the voltage source by the first and the second switches and each stage is coupled to a different stage or to an output of the multi-stage bidirectional electric voltage converter by the third switch; and charging each capacitor in the one or more stages of the multi-stage bidirectional electric voltage converter by placing the first and the second switches in each stage in a closed state, and the third switch in an open state.

DETAILED DESCRIPTION

In this patent document, the word "exemplary" is used to mean serving as an example, instance, or illustration. Any embodiment or configuration described herein as "exemplary" is not necessarily to be construed as preferred or advantageous over other embodiments or configurations. Rather, use of the word exemplary is intended to present concepts in a concrete manner.

A grid-tied electrical system, also called tied to grid or grid tie system, is a semi-autonomous electrical generation or grid energy storage system which links to the electric grid lines to feed excess capacity back to the grid. When insufficient electricity is generated, or the batteries are not fully charged, electricity drawn from the grid can make up the shortfall.

Grid-tied energy storage systems play an increasing role in providing stabilization and security to the energy transmission grid. These systems assist integration of the increasing number of renewable energy sources into the grid by allowing storage of excess energy during peak production times and delivery when needed.

To charge such grid-tied storage systems, several techniques are currently being contemplated to transform a low voltage AC from a flywheel or DC from a battery storage system. Each has drawbacks and few are transformerless and bi-directional. Bi-directionality allows conversion from the AC or DC energy storage to high voltage AC for direct connection to the transmission grid. It also allows direct conversion of the high voltage AC transmission grid to low voltage AC or DC for re-charging the grid-tied storage systems. Bi-directionality is a highly desirable feature for such a voltage conversion system.

Many traditional approaches adopt a transformer between the high voltage and the low voltage output to achieve the voltage conversion. The high voltage input is typically around 13.6 kV while the highest voltage that goes into a facility is typically 240V or lower. However, transformers introduce energy loss. The humming sound coming out of the transformers and the heating generated by these transformers are some of the indicators of energy loss in the voltage conversion process.

Figure 1:
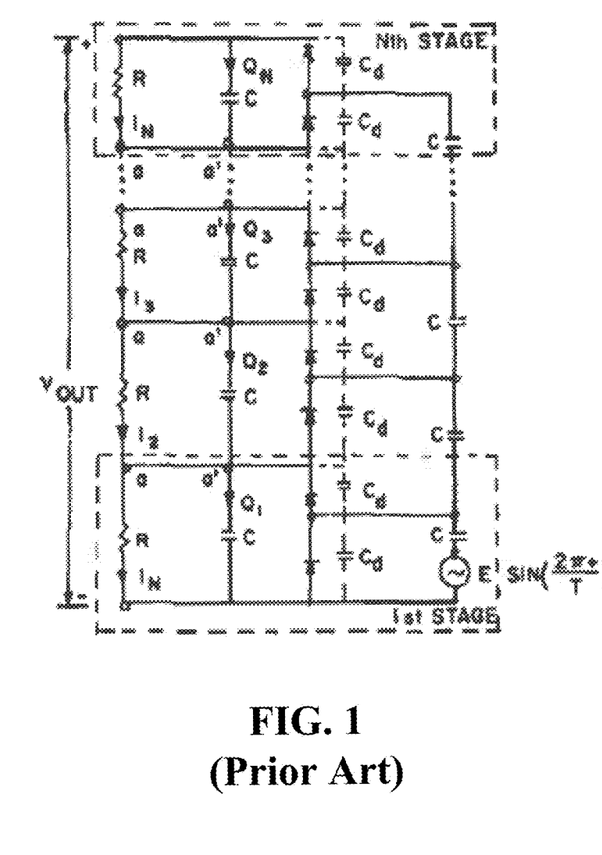
FIG. 1 shows an exemplary diode-based multiplier based on Cockcroft-Walton multiplier circuit.

Some transformerless approaches have been developed in the field. FIG. 1 shows a traditional diode based voltage multiplier circuit (a Cockcroft-Walton multiplier circuit) that can convert an AC input into a high voltage DC output that can subsequently be converted to AC with a second stage (AC output conversion not shown). For DC input, battery storage conversion to AC is required because DC input cannot be handled directly. The output is not instantaneous because it takes a number of cycles to charge to the target high voltage. For example, the delay can be approximately half a cycle per stage. The process is not reversible to allow recharging of the energy storage system from the grid; it cannot convert a high voltage DC into a low voltage.

Figure 2:
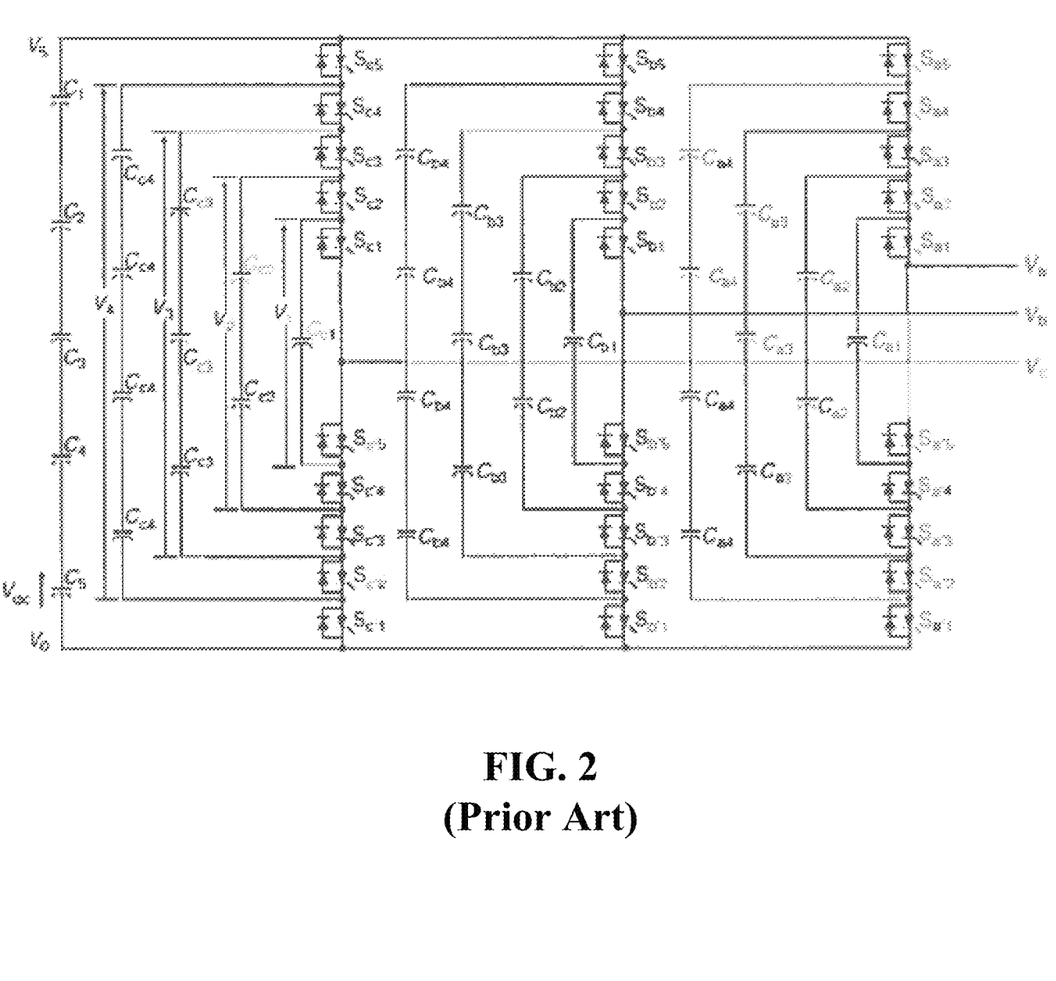
FIG. 2 shows an exemplary three-phase six-level structure of a flying capacitor inverter.

FIG. 2 shows a three-phase six-level structure of a flying capacitor inverter. The flying capacitor inverter approach has been widely adopted. It is possible to use this multiplier method for charging "flying" capacitors for AC conversion. However, the diode multiplier takes multiple cycles for multiple stages of multiplication. Thus, the output is not instantaneous which makes it difficult to implement a simple DC to AC conversion process. Additionally, voltage gain is limited in these traditional voltage multiplier circuits because of the charging diode capacitance and other parasitic elements.

Figure 3:
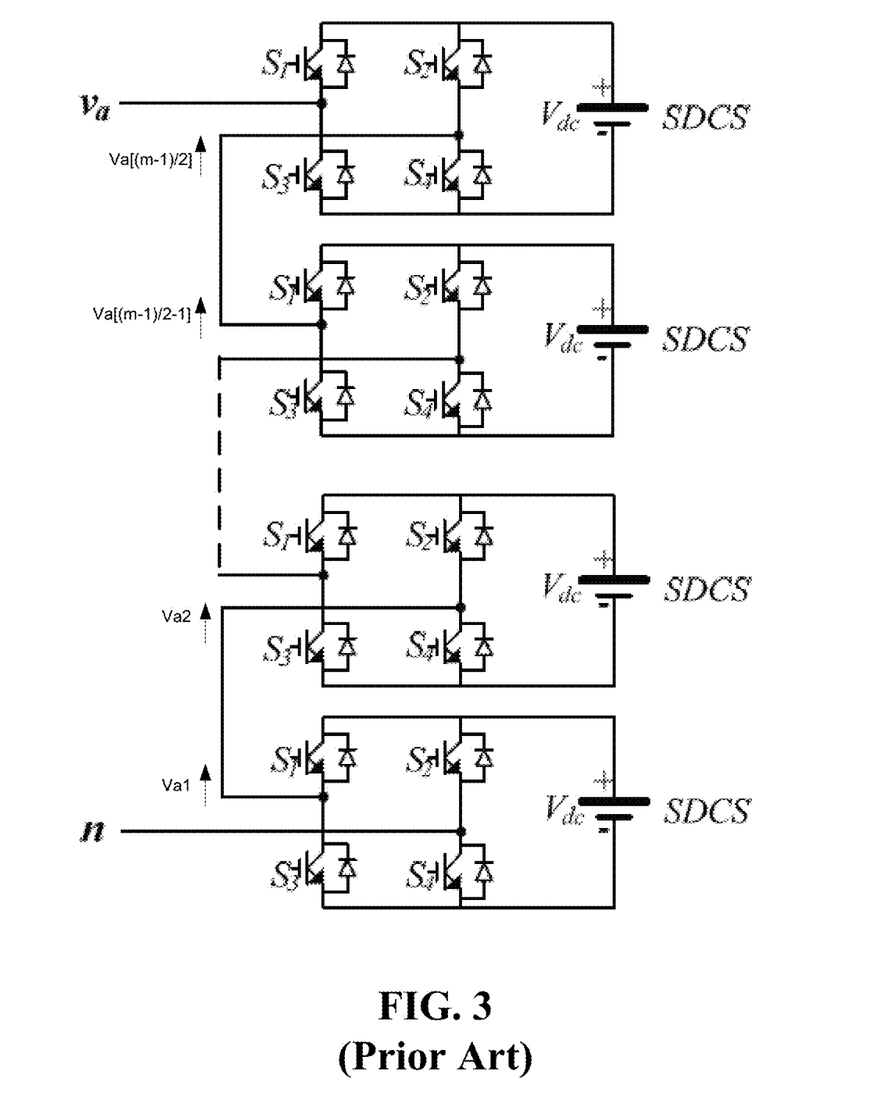
FIG. 3 shows an exemplary topology for transformerless conversion of DC grid-tied storage to high voltage AC.
Figure 4:
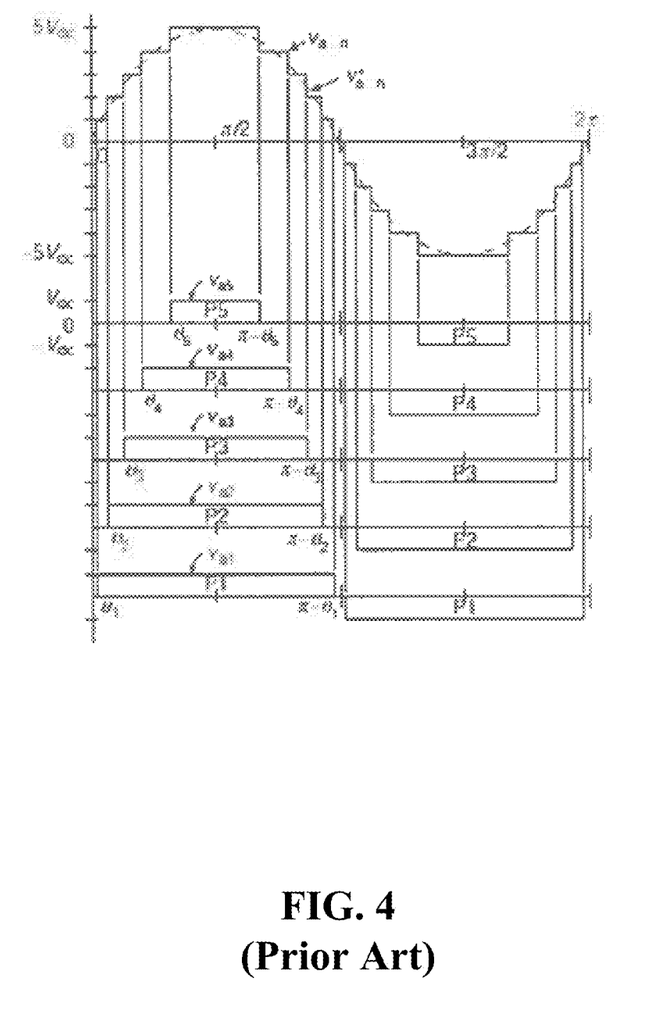
FIG. 4 shows an exemplary output voltage of a eleven-level cascade inverter.

FIG. 3 shows another approach using a multi-level power converter topology. This approach has been proposed widely as it can multiply a low voltage DC input into high voltage AC in one step. Thus, the expense and bulk of a 60 Hz high voltage transformer is eliminated. In this approach, separate DC sources (SDCS) and a switching network form one element in a series stack of elements. The switching network, typically the H-Bridge, creates either a −1, 0, or +1 times the SDCS voltage at each element, up to the full targeted potential. FIG. 4 indicates that, by controlling each element separately, a series stack can be summed together to create a step-wise synthesis of a 60 Hz AC high voltage output.

The approach has several disadvantages. First, it requires independent isolated voltage sources above ground. Therefore, each source requires insulation from ground depending on the relative position in the series stack. For a 12.47 kV AC utility line interface, the SDCS source (e.g. stacked batteries) must be elevated to that potential and the peak insulation requirement of the highest SDCS source is around 17 kV. Second, four switches of the same voltage rating are required per element. The signal that drives the top switch at the high side of the system must be a floating driver to be able to turn the top switch on and off. Therefore, it is essential to provide enough drive power at elevated potential to drive the upper most stage of the system. A complex gate drive isolation method with ground isolation is also required for each of the elevated semiconductor switches. Although FIG. 4 shows a voltage synthesis of five stages, in practice, only two or three stages of different voltages can be achieved, leading to a very coarse synthesis of AC voltage output. The coarse synthesis generates harmonics that may destroy electrical equipment. Removal of harmonics is necessary, but that comes with the price of losing additional energy.

Using independent isolated sources, such as batteries, requires that individual cell groupings be insulated above ground on a cascaded "hot deck". Considering the battery cell volume, containerizing such a system with air insulation would be difficult given the height constraint of a typical shipping container of around 2.3 m. If batteries are connected to a photovoltaic (PV) array, high voltage isolation switching would also be required for each battery group above ground to allow either charging or discharging. This added complexity adversely impacts the overall system size, complicates the topology, and does not allow simultaneous conversion for the AC utility lines and charging of the batteries. It is possible to eliminate the high voltage isolation switching between such a renewable energy source and battery by "hot decking" the individual sources, but accelerated degradation occurs in photovoltaics using this configuration. Other approaches have used a pre-inverter stage using high voltage isolation transformers to meet the independent DC voltage source requirement for this technology, essentially adding more complexity to the system.

This patent document discloses circuits, devices, systems, and methods using a modified switched multiplier topology that allows direct conversion without the need for independent isolated DC sources. The disclosed technology is transformerless and bi-directional; it can have significant applications in charging grid-tied energy storage systems using renewable energy sources.

The disclosed technology leverages the basic features of a Marx generator in addition to several other features and components to produce a transformerless bidirectional conversion system without the above noted disadvantages of the prior systems. A Marx generator is an electrical circuit first described by Erwin Otto Marx in 1924. Its purpose is to generate a high-voltage pulse from a low-voltage DC supply. The circuit generates a high-voltage pulse by charging a number of capacitors in parallel, then connecting them in series.

Figure 5:
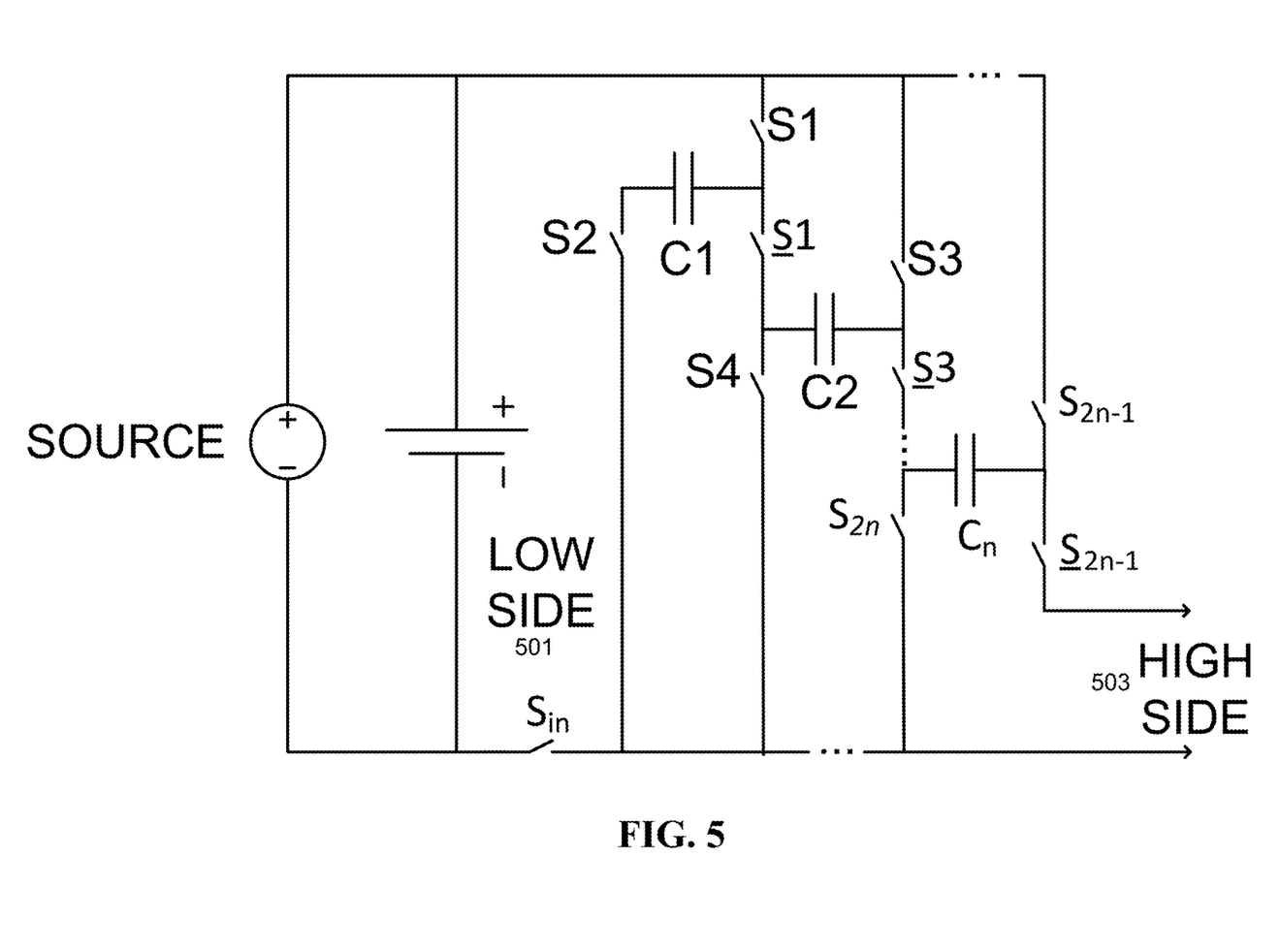
FIG. 5 shows an exemplary switched multiplier topology without the requirement of isolated voltage sources.

In many installations for renewable energy projects, a stack of power storage units, such as batteries, are used as a storage mechanism to release the stored energy into the high voltage side when "buy-back" of the electricity is favorable to users. FIG. 5 shows an example embodiment of a transformerless and bi-directional switched multiplier topology applicable to such installations for any renewable energy form, including solar or wind. The depicted topology includes n stages (n≥1) each having a capacitor $C_n$, that is connected to another stage and to the source via switches S2n, S(2n−1) and S̲(2n−1). The "LOW SIDE" 501 can be the voltage level from battery sources, for example. The "HIGH SIDE" 503 can be the voltage level from transmission lines, whose voltage can be as high as multiple hundreds of volts (e.g. 69 kV, 115 kV, 230 kV, 500 kV, 765 kV). The voltage level of a typical utility transmission line is 13.6 kV. Unlike a diode multiplier circuit, the high voltage output is obtained in one cycle. The maximum gain provided by this topology is the charge on the capacitor times the number of capacitors. Similar to the configuration shown in FIG. 2, switches can be configured to create a step-wise synthesis of an AC high voltage output. The "HIGH SIDE" level 503 relative to the neutral is determined by which S2n, switch is closed. In this particular embodiment, the maximum output is achieved with S2 closed.

Figure 6A:
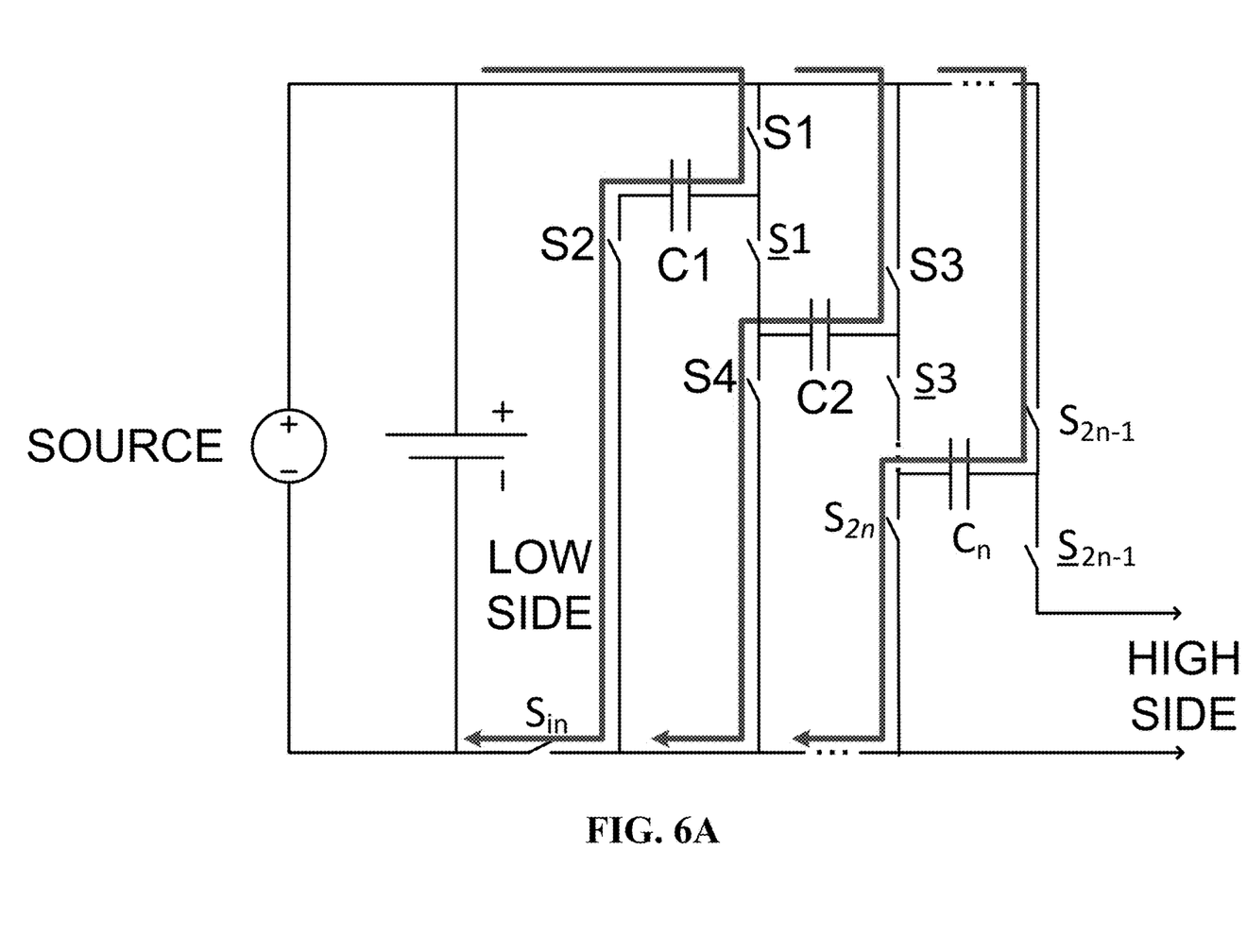
FIG. 6A shows an exemplary charging cycle of the switched multiplier topology.
Figure 6B:
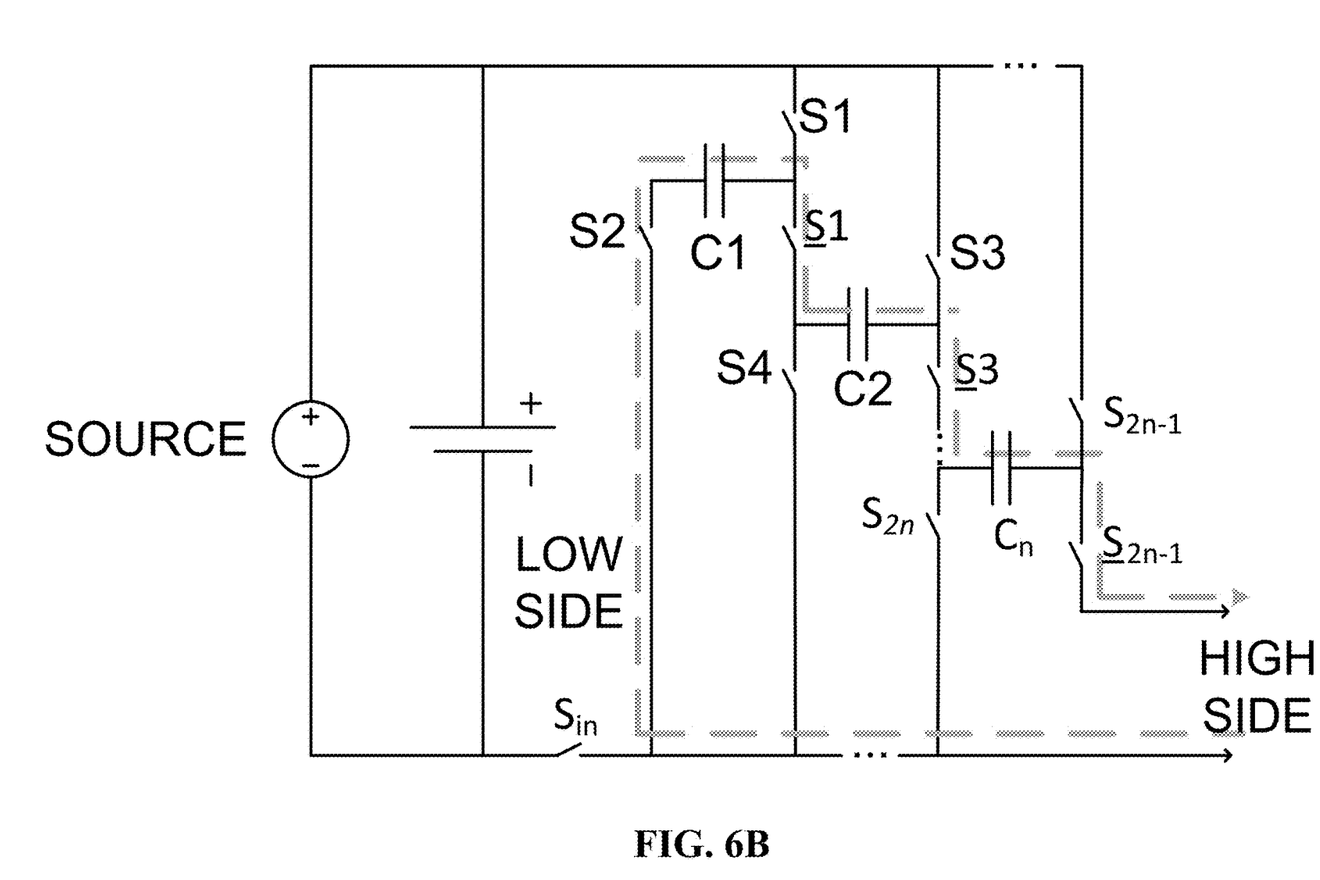
FIG. 6B shows an exemplary discharging cycle of the switched multiplier topology.

FIG. 6A and FIG. 6B show demonstrate the operation of the system in accordance with exemplary embodiments.

FIG. 6A shows a charging cycle of the switched multiplier topology. Switches S2n, and S(2n-1) (for n≥1) are closed with S(2n-1) open, allowing the capacitors to charge in parallel during one cycle. Arrows in FIG. 6A indicate the direction of the current in a charging cycle.

FIG. 6B shows a discharging cycle of the switched multiplier topology. The capacitors are connected in series through switches S(2n-1) with S2n, and S(2n-1) open in the succeeding cycle. Dashed arrows in FIG. 6B indicate the direction of the current in a discharging cycle.

Table 1 demonstrates a truth table of the switching algorithm for the $n^{th}$ stage. $S_{in}$, as shown in FIG. 5, allows neutral isolation during discharge. The number of stages, n, can be much more than two or three stages that are used in the traditional approaches. In some embodiments, ten stages can be easily implemented because there is no need to elevate and insulate SDCS sources above ground.

TABLE I

Switched multiplier truth table

| Switch | State | |
|---|---|---|
| | Charge | Discharge |
| $S_{IN}$ | 1 | 0 |
| S1 | 1 | 0 |
| S1 | 0 | 1 |
| S2 | 1 | * |
| S3 | 1 | 0 |
| S3 | 0 | 1 |
| S4 | 1 | * |
| $S_{2n-1}$ | 1 | 0 |
| $S_{2n-1}$ | 0 | 1 |
| $S_{2n}$ | 1 | * |

The disclosed topology is bi-directional so that the "HIGH SIDE" 503, as shown in FIG. 5, can now serve as an input to charge the capacitor in series and then discharge them in parallel into the energy storage systems. Micromanaging the output voltage in either direction, e.g., controlling voltage element separately to create a step-wise synthesis of AC voltage output as demonstrated in FIG. 4, can be done with phase control. Therefore, global and fine control of the level can be easily implemented. Again, there is no concern about individual voltage sources being elevated.

The disclosed topology can be designed for a specific low voltage on the "LOW SIDE" 501, as shown in FIG. 5, and a specific high voltage on the "HIGH SIDE" 503. However, it is also possible to have multiple taps to provide any voltage in between the low and high voltage levels. Besides its application in renewable energy field, the disclosed systems can be used in other systems and applications that require voltage conversion, including DC to AC, AC to DC, and DC to DC conversions. For example, the disclosed topology can accomplish DC conversions between the generator and the motor in a generator-motor set on large cruise ships.

In some embodiments, switches S2n, and S(2n-1) cab be light-driven switches, such as linear photoconductive switches. A photoconductive switch is an electrical switch that is controlled by an optical input (e.g., light) to cause photo-induced conductivity of the switch material. For example, light applied to the switch material can increase its electrical conductance as a consequence of irradiation with light. The photoconductive switch eliminates the complexity introduced by having floating gate drivers as discussed above. Further details regarding the photoconductive switch can be found in U.S. Patent Publication No. 2014/0270777 A1, filed on Mar. 18, 2014, which is hereby incorporated by reference in its entirety.

Figure 7:
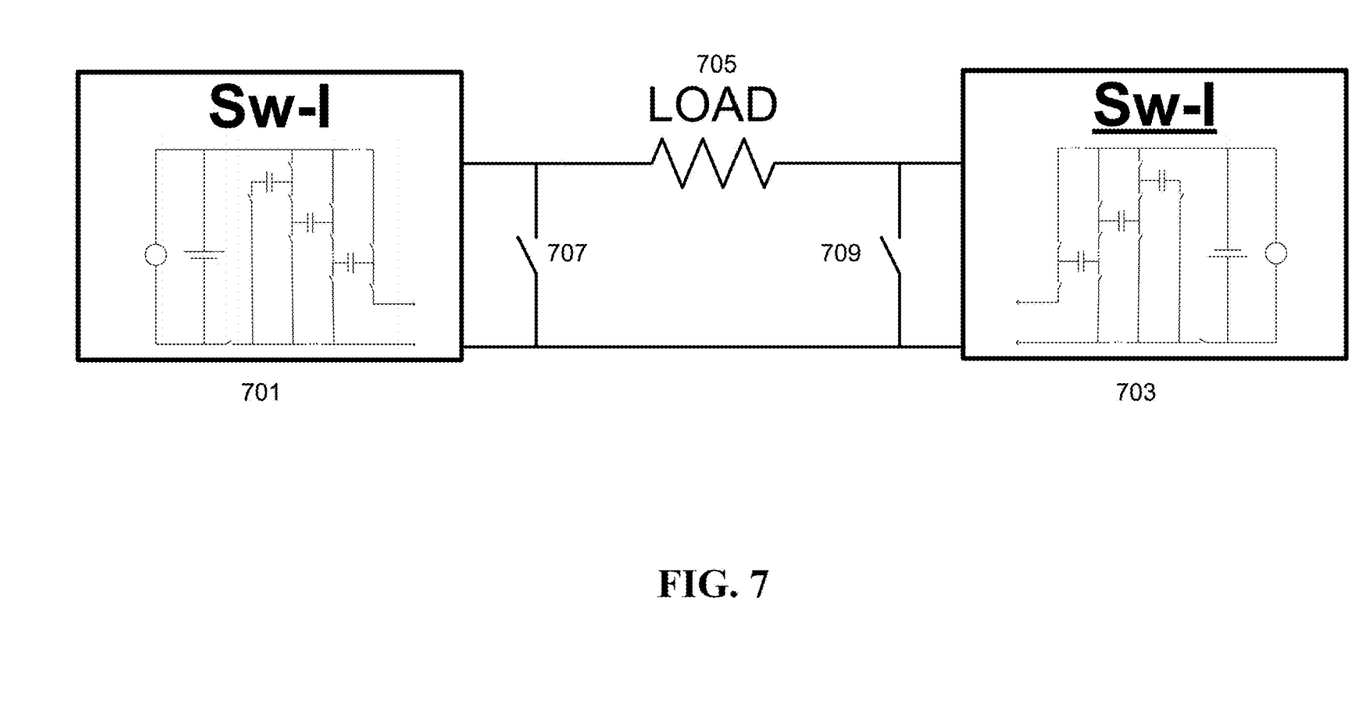
FIG. 7 shows an exemplary positive-negative switched multiplier.

The exemplary circuit shown in FIG. 5 can be a basic building block to construct additional embodiments of the system. FIG. 7 demonstrates some additional embodiments are made possible by the topology shown in FIG. 5. In FIG. 7, two identically configured elements, Sw-I 701 and Sw-I 703, are connected across a load 705. Each of Sw-I 701 and Sw-I 703 elements are similar to the configuration of FIG. 5, but the charge and discharge cycle of Sw-I is 180° out of phase with Sw-I. The HIGH SIDE switches, the right-hand side switch 709 for Sw-I and the left-hand side switch 707 for Sw-I, provide the neutral reference. For example, when the left side 701 is being charged, switch 707 is closed. However, in order to prevent shorting of the associated voltage supply, the last switch on the last capacitor of Sw-I 701 has to be opened. The current flows from Sw-I 703 through the load 705, switch 707, and back. On the next cycle, switch 709 is closed while switch 707 and the last switch of the last capacitor of 703 are now opened. Current then flows from Sw-I 701 through the load 705, switch 709, and back to Sw-I 701. The S2n, switches can also be coordinated sequentially on the discharge cycle to step-wise synthesize a 60 Hz high voltage envelope. Such configuration, as shown in FIG. 7, allows voltages alternating around a mid-value of zero to form. In some embodiments, voltage output of a square wave can be achieved, without a transformer, with a center tap that is grounded. In some embodiments, switch 707 and 709 can be replaced by active components such as diodes.

Figure 8:
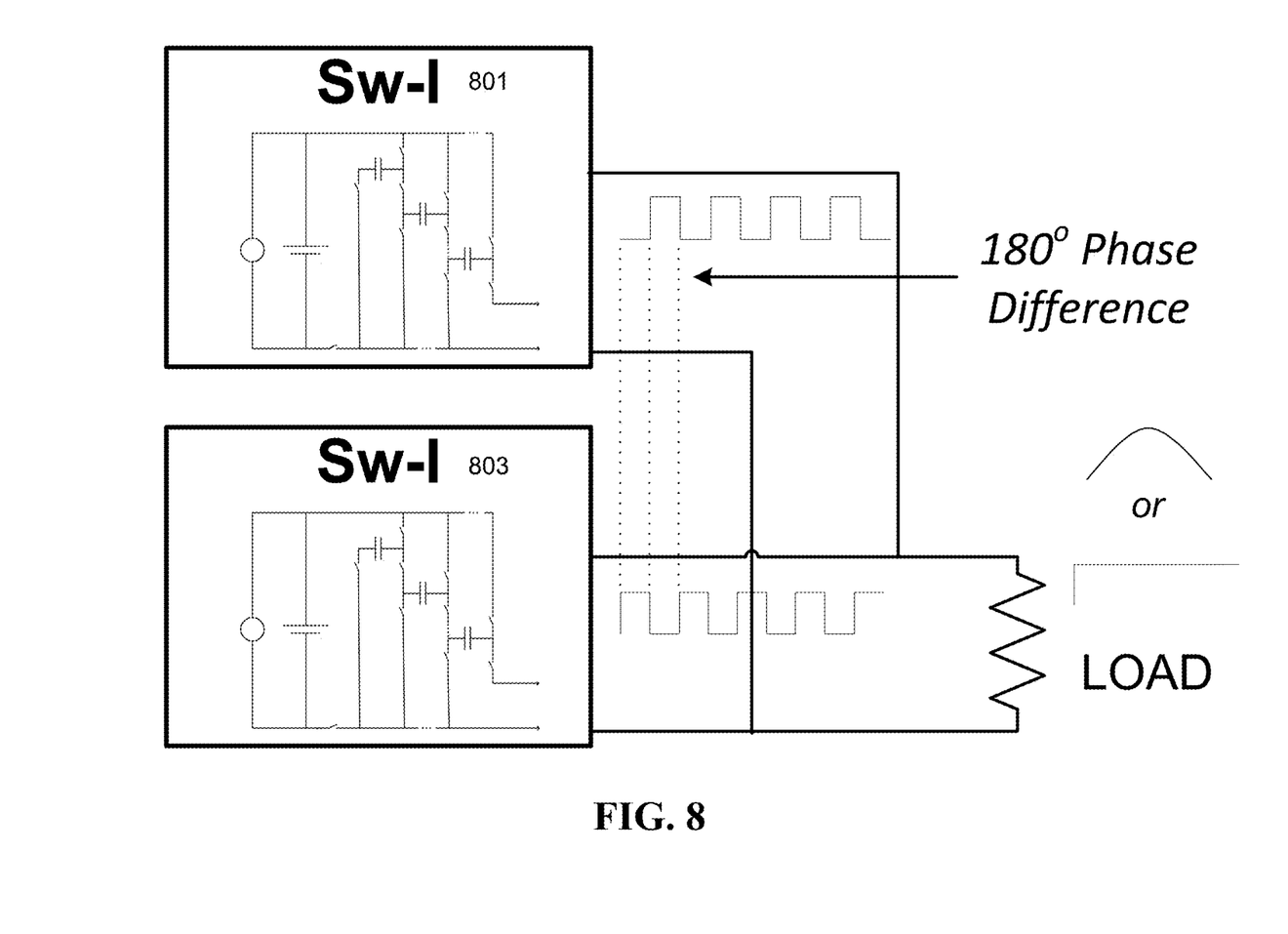
FIG. 8 shows an exemplary switched multiplier topology using Gatling gun mode.

FIG. 8 shows an alternate configuration to eliminate the zero voltage during the charge cycle, i.e., no output voltage is produced when the capacitors are in a charging mode, to minimize potential high frequency switching harmonics introduced into the 60 Hz output. Each of Sw-I 801 and Sw-I 803 elements are similar to the configuration of FIG. 5. Although the use of low pass filters are possible, a "Gatling gun mode" can be used to fill in the zero output voltage state of the circuit. This filling in is accomplished by using similar phasing discussed in FIG. 7, but using an identical polarity input. In this way, while on switched multiplier is charging, the other is generating an output voltage. Isolation between the two units occurs because of the switches. Again, the S2n, switches can be coordinated sequentially on the discharge cycle to synthesize a 60 Hz high voltage envelope. In this embodiment, a second negative going system would be required.

In some embodiments, the baseline switching frequency in the forward direction is 100 kHz to minimize the capacitor volume and the effect of parasitic switch capacitance on the system gain. This higher frequency also makes the system more reliable and fault tolerant because of the decreased ripple on the capacitors and the less energy stored in the conversion system. Although both frequency and stage capacitance can be traded-off to optimize performance at lower switching frequency, the best approach would be push the upper switching frequency as high as possible.

For circuits other than diode based voltage multiplier circuits, any actively switched multiplying topology using junction semiconductors require that the active switches be driven from a controller at ground potential. Although fiber optic control can be easily implemented, power is still required for the gate and associated drive circuits, complicating the overall topology. Thus, to enhance this approach of a grid tied energy storage switched multiplier system, the optically isolated Opticonditor provides certain advantages.

Typical voltages of such a device exceed 75 kHz switching speed at over 15 kV. Further, the device uses light for control so that the highly complex insulating gate drive circuits used in standard multilevel converters are greatly simplified.

Figure 9:
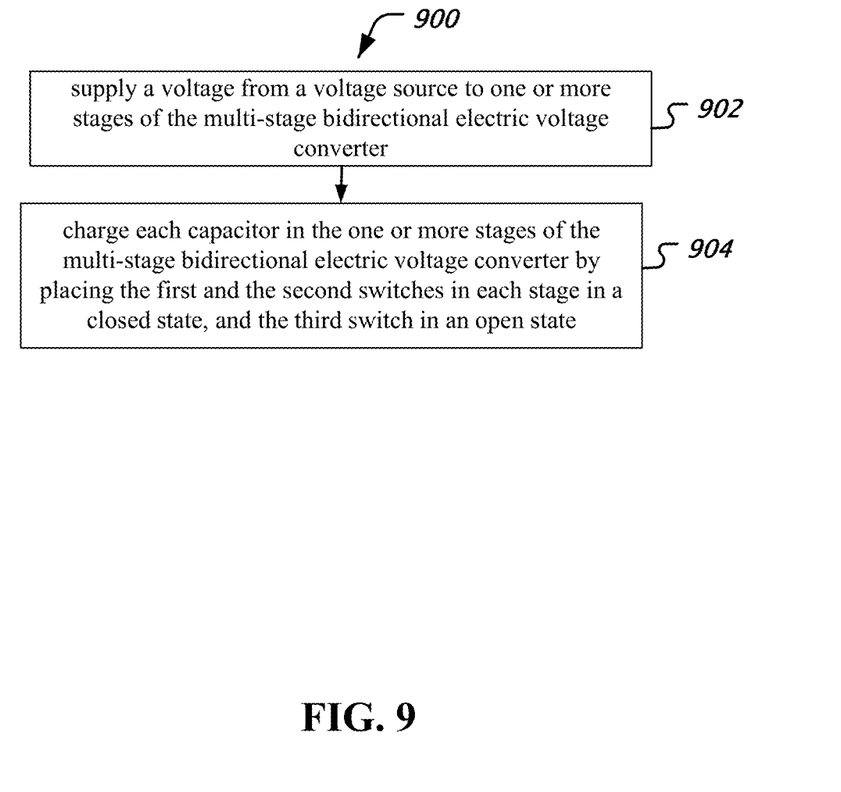
FIG. 9 shows an exemplary flow chart for a method of providing bidirectional voltage conversion by a multi-stage bidirectional electric voltage converter.

FIG. 9 shows an exemplary flowchart for a method 900 of providing a voltage conversion by a multi-stage bidirectional electric voltage converter. The method can be implemented using the topology shown in FIG. 5 as a basic building block.

The method 900 includes, at 902, supplying a voltage from a voltage source to one or more stages of the multi-stage bidirectional electric voltage converter. Each stage of the multi-stage bidirectional electric voltage converter includes a first, a second and a third switch and a capacitor, and the capacitor is coupled to the voltage source by the first and the second switches and each stage is coupled to a different stage or to an output of the multi-stage bidirectional electric voltage converter by the third switch.

The method 900 includes, at 904, charging each capacitor in the one or more stages of the multi-stage bidirectional electric voltage converter by placing the first and the second switches in each stage in a closed state, and the third switch in an open state.

In some embodiments, the method 900 further includes discharging the capacitor to the output of the multi-stage bidirectional electric voltage converter by placing the first and the second switches in each stage in an open state, and the third switch in a closed state.

In one exemplary aspect, a reversible bi-directional multi-stage electric converter is disclosed. The converter comprises an electrical power source, a load side, a command closure electrical switching means, and capacitors. All these elements are arranged to form a power source side and an output load side, wherein on one cycle, capacitors are connected to receive charge from the electrical power source by the switching means while disconnecting the load, and on the alternate cycle, capacitors are connected to the load side by the switching means while disconnecting the power source to deliver charge. The charge transfer from the power source side to the output load side occurs regardless if the position of the power source and output load side are reversed.

A grouping of capacitors is series connected with the power source through the switching means on a cycle to receive charge and parallel connected through the switching means to the load side on the alternate cycle to deliver charge so as to step down the voltage and/or increase available current. A grouping of the capacitors is parallel connected with the power source through the switching means on a cycle to receive charge and series connected through the switching means to the load side on the alternate cycle to deliver charge so as to step up the voltage and/or decrease available current.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A multi-stage electric voltage converter comprising:
    a voltage source; and
    multiple stages, wherein each stage of the multiple stages comprises:
        a first and a second and a third switch, and
        a capacitor, wherein the capacitor is coupled to the voltage source by the first and the second switches and each stage of the multiple stages is coupled to a different stage or to an output of the multi-stage electric voltage converter by the third switch so as to allow the capacitor to be charged by the voltage source when the first and the second switches are closed and the third switch is open, and to allow the capacitor to be disconnected from the voltage source and connected to the output of the multi-stage electric voltage converter to supply a voltage from the capacitor that is disconnected from the voltage source to the output when the first and the second switches are open and the third switch is closed.

2. The multi-stage electric voltage converter of claim 1, wherein the first, second, and third switches are photoconductive switches.

3. The multi-stage electric voltage converter of claim 1, further comprising a switch that allows neutral isolation during discharge.

4. The multi-stage electric voltage converter of claim 3, comprising: a load; and
    a second multi-stage electric voltage converter coupled to the load and the multi-stage electric voltage converter, wherein the second multi-stage electric voltage converter has a charge and discharge cycle 180° out of phase with the multi-stage electric voltage converter.

5. The multi-stage electric voltage converter of claim 4, wherein the multi-stage electric voltage converter includes an input having a same polarity as the second multi-stage electric voltage converter.

6. The multi-stage electric voltage converter of claim 4, wherein the multi-stage electric voltage converter uses an input having a different polarity from the second multi-stage electric voltage converter.

7. The multi-stage electric voltage converter of claim 6, further comprising:
    a fourth switch coupled with the load and the multi-stage electric voltage converter to provide a neutral reference; and
    a fifth switch coupled with the load and the second multi-stage electric voltage converter to provide the neutral reference.

8. The multi-stage electric voltage converter of claim 6, further comprising:

a first diode coupled with the load and the multi-stage electric voltage converter; and a second diode coupled with the load and the second multi-stage electric voltage converter.

9. The multi-stage electric voltage converter of claim 1, wherein the output of the multi-stage electric voltage converter is connected to an electrical grid.

10. The multi-stage electric voltage converter of claim 1, wherein the voltage source is coupled to, or is part of, a renewable energy generation system.

11. The multi-stage electric voltage converter of claim 10, wherein the renewable energy generation system includes a solar power generation device.

12. The multi-stage electric voltage converter of claim 10, wherein the renewable energy generation system includes a wind turbine.

13. The multi-stage electric voltage converter of claim 1, wherein the multiple stages convert voltage from the voltage source to the output of the multi-stage electric voltage converter without using separate DC sources (SDCS).

14. The multi-stage electric voltage converter of claim 1, wherein the multiple stages convert voltage from the voltage source to the output of the multi-stage electric voltage converter without using an electrical transformer.

15. A bidirectional electric converter, comprising:
an electrical power source;
an output load; and
a cascade configuration of a plurality of stages, wherein each stage of the plurality of stages comprises more than two switches and a capacitor coupled to the switches to transfer power from the electrical power source to the output load, wherein the capacitor of each stage is, in a charging cycle, configured to receive the power from the electrical power source and disconnect from the output load, and in a discharging cycle, configured to disconnect from the electrical power source and transfer the power from the capacitor that is disconnected from the electrical power source to the output load,
wherein positions of the electrical power source and the output load are interchangeable.

16. The bidirectional electric converter of claim 15, wherein: the electrical power source provides a high voltage; and
a capacitor of one stage of the plurality of stages is connected in series with a capacitor of next stage of the plurality of stages through the switches in the charging cycle and is connected in parallel with the capacitor of the next stage of the plurality of stages through the switches in the discharging cycle such that the plurality of stages deliver a voltage lower than the high voltage to the output load.

17. The bidirectional electric converter of claim 15, wherein: the electrical power source provides a low current; and
a capacitor of one stage of the plurality of stages is connected in series with a capacitor of next stage of the plurality of stages through the switches in the charging cycle and is connected in parallel with the capacitor of the next stage of the plurality of stages through the switches in the discharging cycle such that the plurality of stages deliver a current higher than the low current to the output load.

18. The bidirectional electric converter of claim 15, wherein: the electrical power source provides a low voltage; and a capacitor of one stage of the plurality of stages is connected in parallel with a capacitor of next stage of the plurality of stages through the switches in the charging cycle and is connected in series with the capacitor of the next stage of the plurality of stages through the switches in the discharging cycle such that the plurality of stages deliver a voltage higher than the low voltage to the output load.

19. The bidirectional electric voltage converter of claim 15, wherein: the electrical power source provides a high current; and
a capacitor of one stage of the plurality of stages is connected in parallel with a capacitor of next stage of the plurality of stages through the switches in the charging cycle and is connected in series with the capacitor of the next stage of the plurality of stages through the switches in the discharging cycle such that the plurality of stages deliver a current lower than the high current to the output load.

20. The bidirectional electric converter of claim 15, wherein the electric power source provides a direct current (DC) voltage and the output load consumes a direct current (DC) voltage.

21. The bidirectional electric voltage converter of claim 15, wherein the electric power source provides an alternating current (AC) voltage and the output load consumes a direct current (DC) voltage.

22. The bidirectional electric voltage converter of claim 15, wherein
the electric power source is at a voltage level of 13.6 kV, and is connected to a utility transmission line; and
the output load is at a voltage level below 240V, and is connected to an energy generation device.

23. A method of providing a voltage conversion by a multi-stage bidirectional electric voltage converter, comprising:
supplying a voltage from a voltage source to one or more stages of the multi-stage bidirectional electric voltage converter, wherein:
each stage of the multi-stage bidirectional electric voltage converter includes a first, a second and a third switch and a capacitor, and
the capacitor is coupled to the voltage source by the first and the second switches and each stage is coupled to a different stage or to an output of the multi-stage bidirectional electric voltage converter by the third switch;
charging each capacitor in the one or more stages of the multi-stage bidirectional electric voltage converter by placing the first and the second switches in each stage in a closed state, and the third switch in an open state; and
discharging the capacitor to the output of the multi-stage bidirectional electric voltage converter by placing the first and the second switches in each stage in an open state, and the third switch in a closed state to disconnect the capacitor from the voltage source and allow the capacitor that is disconnected from the voltage source to supply a voltage to the output.

24. The method of claim 23, wherein the voltage source has a voltage level below 240V and the output of the multi-stage bidirectional electric voltage converter has a voltage level above 10 kV.

25. The method of claim 23, wherein the voltage source has a voltage level above 10 kV and the output of the multi-stage bidirectional electric voltage converter has a voltage level below 240 V.

26. The method of claim 23, wherein the multi-stage bidirectional electric voltage converter converts voltage from the voltage source to the output without using separate DC sources (SDCS).

27. The method of claim 23, wherein the multi-stage bidirectional electric voltage converter converts voltage from the voltage source to the output without using an electrical transformer.

* * * * *